US010115146B1

(12) United States Patent
Anderson et al.

(10) Patent No.: US 10,115,146 B1
(45) Date of Patent: Oct. 30, 2018

(54) SCORING CANDIDATES FOR SET RECOMMENDATION PROBLEMS

(71) Applicant: GOOGLE INC., Mountain View, CA (US)

(72) Inventors: John Roberts Anderson, San Anselmo, CA (US); Ryan Michael Rifkin, San Francisco, CA (US); Jay Yagnik, Mountain View, CA (US); Rasmus Larsen, San Jose, CA (US); Sarvjeet Singh, Sunnyvale, CA (US); Yi-Fan Chen, Sunnyvale, CA (US); Anandsudhakar Kesari, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 531 days.

(21) Appl. No.: 14/688,691

(22) Filed: Apr. 16, 2015

Related U.S. Application Data (60) Provisional application No. 62/101,199, filed on Jan. 8, 2015.

(51) Int. Cl.
G06Q 30/00 (2012.01)
G06Q 30/06 (2012.01)
G06Q 30/02 (2012.01)

(52) U.S. Cl.
CPC ......... *G06Q 30/0631* (2013.01); *G06Q 30/02* (2013.01)

(58) Field of Classification Search
None
See application file for complete search history.

(56) References Cited

U.S. PATENT DOCUMENTS 6,993,532 B1   1/2006  Platt et al.
8,165,414 B1   4/2012  Yagnik
(Continued)

OTHER PUBLICATIONS

Liu, Xianglong, Collaborative Hashing, Oct. 17, 2014, 2014 IEEE Conference on Computer Vision and Pattern Recognition, p. 2147-2154.*

(Continued)

*Primary Examiner* — William J Allen
*Assistant Examiner* — Timothy Kang
(74) *Attorney, Agent, or Firm* — Brake Hughes Bellermann LLP (57) ABSTRACT

Implementations include systems and methods for scoring candidates for set recommendation problems. An example method includes repeating, for each code in code arrays for items in a set of items, determining a most common value for the code. In some implementations, the method includes determining that the most common value occurs with a frequency that meets an occurrence threshold and adding the code and the most common value to set-inclusion criteria. In other implementations, the method includes determining a value for the code from a code array for a seed item and adding the code and the most common value to set-inclusion criteria when the value for the code from the code array for the seed item matches the most common value. The method may also include evaluating a similarity with a candidate item based on the set-inclusion criteria and basing a recommendation regarding the candidate item on the similarity.

20 Claims, 7 Drawing Sheets

(56) References Cited

U.S. PATENT DOCUMENTS

| | | |
|---|---|---|
| 8,239,333 B2 | 8/2012 | Yang et al. |
| 8,554,764 B2 | 10/2013 | Mosol et al. |
| 8,655,915 B2 | 2/2014 | Kenedy et al. |
| 9,691,096 B1 * | 6/2017 | Dai .................... G06Q 30/0631 |
| 2006/0101057 A1 * | 5/2006 | Farkkila ................. G06Q 10/00 |
| 2010/0169340 A1 * | 7/2010 | Kenedy .............. G06Q 30/0631 707/758 |
| 2012/0059819 A1 * | 3/2012 | Wheeler ........... G06F 17/30867 707/723 |
| 2013/0006765 A1 * | 1/2013 | Lee .................. H04N 21/44222 705/14.53 |
| 2013/0159317 A1 * | 6/2013 | Huang .............. G06F 17/30867 707/748 |
| 2014/0114985 A1 * | 4/2014 | Mok .................. G06Q 30/0271 707/748 |
| 2014/0280140 A1 * | 9/2014 | Ling ................ H04N 21/26283 707/737 |
| 2014/0351079 A1 | 11/2014 | Dong et al. |

OTHER PUBLICATIONS

Yagnik, et al., "The Power of Comparative Reasoning", IEEE Conference on Computer Vision, Nov. 2011, 8 pages.

* cited by examiner

SCORING CANDIDATES FOR SET RECOMMENDATION PROBLEMS

RELATED APPLICATION

This application claims priority to U.S. Provisional Application Ser. No. 62/101,199, filed Jan. 8, 2015, entitled "SCORING CANDIDATES FOR SET RECOMMENDATION PROBLEMS," the disclosure of which is incorporated herein by reference.

BACKGROUND

Recommendation systems can be used to enhance a user's online experience. For example, when a user is shopping and selects an item, the online store may recommend other items for purchase based on prior purchases of people who have purchased the selected item. This type of recommendation system bases a recommendation on past history information for other users. Other recommendation systems may use vector similarity models, e.g., embedding vectors, to represent the aspects of various items, such as pictures, videos, audio clips, communities, etc. Such systems are able to compare the embedding vector of one item to the embedding vector of another item via a dot product to determine how similar the two items are. These systems are useful for classifying individual items, but are susceptible to noise in the embedding vectors, as such vectors often track hundreds or even thousands of aspects for an item.

SUMMARY

Implementations provide an improved recommendation system that determines how similar a single item is with a set of items. In other words, implementations may determine whether the item belongs in the set or not. Such information can be used to provide personalized recommendations of items to a user. For example, if a recommendation system has a pool of items to recommend based on the current item (e.g., people who watched this also watched these), the recommendation system may select items from the pool that are more similar to things the user accessed in the past. Of course, implementations are not limited to videos, songs, goods purchased, etc., but can be used in a similar manner to personalize the suggestions of any items offered by any recommendation system.

In one aspect, a computer-implemented method of providing recommendations of items includes repeating, for each code in code arrays for items in a set of items, determining a most common value for the code, determining whether the most common value occurs with a frequency that meets an occurrence threshold, and adding the code and the most common value to set-inclusion criteria when the frequency meets the occurrence threshold. The method also includes evaluating a similarity with a candidate item based on the set-inclusion criteria to and making a recommendation regarding the candidate item based on the similarity.

In another aspect, a method of providing recommendations of items includes repeating, for each of a plurality of codes in code arrays for items in a set of items, the code representing a hash derived from a vector similarity model, determining a most common value for the code, determining a value for the code from a code array for a seed item, and adding the code and the most common value to set-inclusion criteria when the value for the code from the code array for the seed item matches the most common value. The method also includes using the set-inclusion criteria to evaluate similarity with a candidate item and making a recommendation regarding the candidate item based on the similarity.

According to another aspect, a system includes at least one processor, a data store of items, and a memory storing instructions that, when executed by the at least one processor, cause the system to perform operations. The operations include determining that a first user and a second user each recently accessed a first item from the data store of items and determining a plurality of items from the data store that are related to the first item. The operations also include repeating, for each of a plurality of codes in code arrays for items associated with the first user, determining a consensus value for the code in the plurality of code arrays, determining a value for the code from a code array for the first item, and adding the code and the consensus value to set-inclusion criteria for the first user when the value for the code from the code array for the first item matches the consensus value. The operations further include repeating, for each of a plurality of codes in code arrays for items associated with the second user: determining a most common value for the code in the plurality of code arrays, determining a value for the code from a code array for the first item, and adding the code and the consensus value to set-inclusion criteria for the second user when the value for the code from the code array for the first item matches the consensus value. The operations also include selecting a first subset of the plurality of items related to the first item for recommendation to the first user based on the set-inclusion criteria for the first user and selecting a second subset of the plurality of items related to the first item for recommendation to the second user based on the set-inclusion criteria for the second user, wherein the first subset differs from the second subset.

According to an aspect, a system includes at least one processor, and memory storing instructions that, when executed by the at least one processor, cause the system to perform operations. The operations may include repeating, for each of a plurality of codes in code arrays for items in a set of items, the code representing a hash derived from a vector similarity model, determining a consensus value for the code in the code arrays, determining a value for the code from a code array for a seed item, and adding the code and the consensus value to set-inclusion criteria when the value for the code from the code array for the seed item matches the consensus value. The operations may also include using the set-inclusion criteria to evaluate similarity with a candidate item and making a recommendation regarding the candidate item based on the similarity.

In another aspect, a method includes determining aspect values of an item recently viewed by a user that are also consensus aspect values of items previously viewed by the user, determining items viewed by others who also viewed the item recently being viewed by the user, determining at least one of the items viewed by others is similar to the items previously viewed by the user based on the determined aspect values, and suggesting the at least one item to the user for viewing.

According to an aspect, a method includes determining that a first user and a second user are viewing an item, determining first user preferences for the first user, and determining second user preferences for the second user. The method may also include suggesting a first recommendation set to the first user based on similarities between the item and the first user preferences, and suggesting a second recommendation set to the second user based on similarities between the item and the second user preferences, wherein the first recommendation set differs from the second recommendation set.

Another aspect of the disclosure can be embodied on a computer-readable medium having recorded thereon instructions that, when executed by a processor of a computer system, cause the computer system to perform any of the disclosed methods, operations, or processes. Another general aspect includes a system and/or method for scoring candidate items for set recommendation problems, substantially as shown in and/or described in connection with at least one of the figures, and as set forth more completely in the claims disclosed herein.

One or more of the implementations of the subject matter described herein can be implemented so as to realize one or more of the following advantages. As one example, a recommendation system is able to personalize recommendations for a user based on user preferences. The user preferences may represent historical interactions of the user with similar items. Thus, the system can from a pool of potential recommendations, select those that a user is more likely to be interested in based on past actions by the user. As another example, the system may infer user intent for accessing an item (e.g., a video the user is viewing or recently viewed) based on past user actions. The intent may be used to inform recommendations. As another example, the system may be used to automatically categorize items with a set of items. As another example, the system may personalize recommendations based on a path the user takes while viewing items and/or allow the user to progressively refine their choice across multiple interactions.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
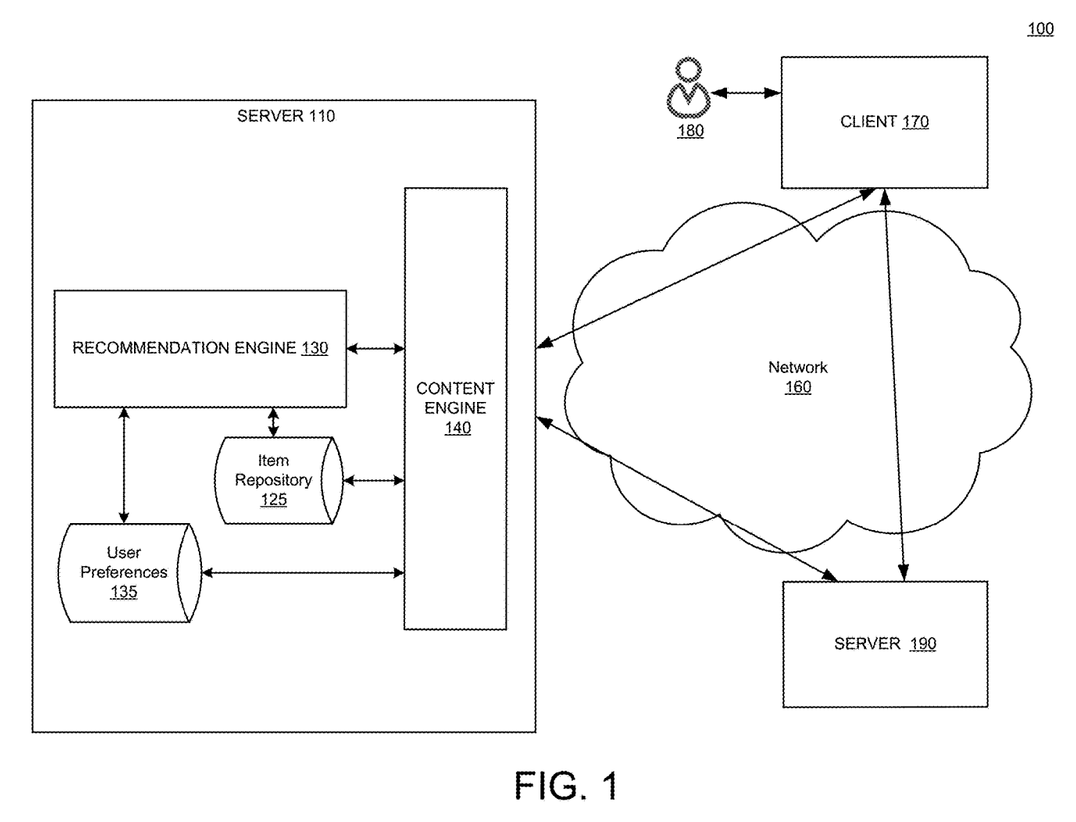
FIG. 1 illustrates an example system in accordance with the disclosed subject matter.

FIG. 1 is a block diagram of a recommendation system in accordance with an example implementation. The system 100 may be used to score a candidate item against a set of items to determine how similar the candidate item is with the set. In other words, the recommendation system determines how similar a candidate item is to the set of items. This may be useful, for example, for categorizing a new item to be added to a database or, as another example, for enabling the system to recommend items to a user, which align with the user's preferences or recent history. By way of example only, the depiction of system 100 in FIG. 1 is described as a system for personalizing video recommendations based on a history of videos the user has watched. However, implementations may be used in other configurations. For example, implementations may automatically categorize or recommend goods, websites, advertisements, digital content, groups, communities, or activities (collectively "items") to a user. It is understood that the present disclosure can be applied to any set recommendation problem, and is not limited to the example applications provided herein.

Figure 7:
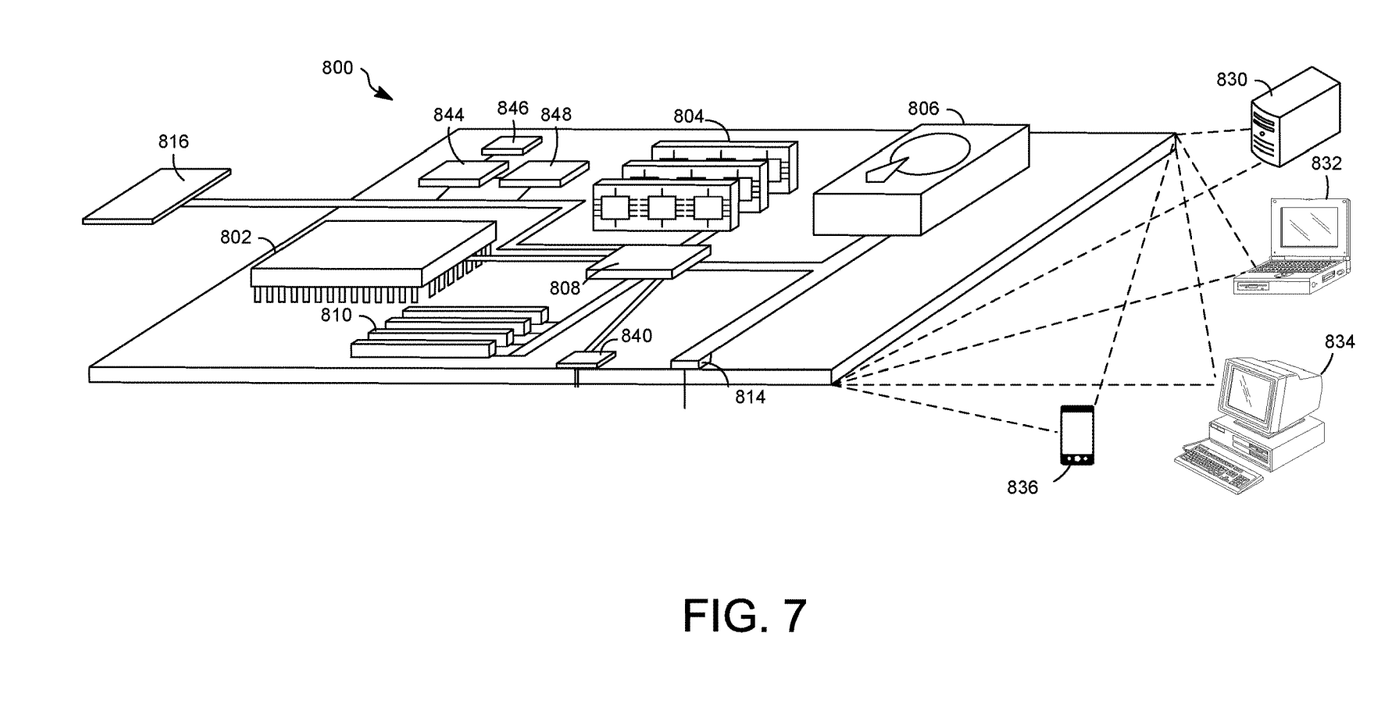
FIG. 7 shows an example of a computer device that can be used to implement the described techniques.
Figure 8:
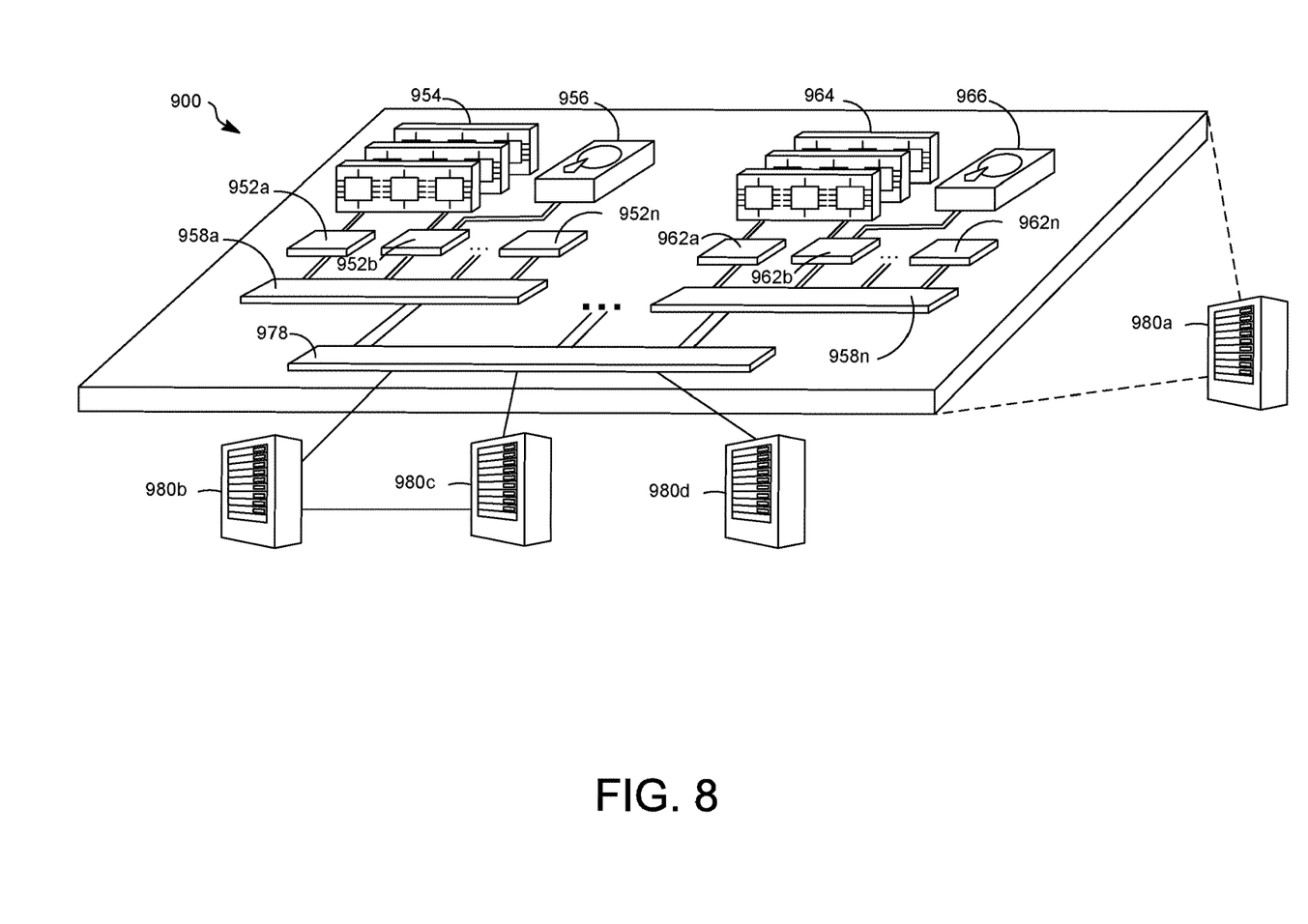
FIG. 8 shows an example of a distributed computer device that can be used to implement the described techniques.

The recommendation system 100 may include a server 110, which may be a computing device or devices that take the form of a number of different devices, for example a standard server, a group of such servers, or a rack server system. In addition, server 110 may be implemented in a personal computer, for example a laptop computer. The server 110 may be an example of computer device 700, as depicted in FIG. 7, or computer device 800, as depicted in FIG. 8. It is understood that the server 110 may represent multiple computers in a distributed computing environment.

Although not shown in FIG. 1, the server 110 can include one or more processors configured to execute one or more machine executable instructions or pieces of software, firmware, or a combination thereof. The server 110 can also include an operating system and one or more computer memories, for example, a main memory, configured to store one or more pieces of data, either temporarily, permanently, semi-permanently, or a combination thereof. The memory may include any type of storage device that stores information in a format that can be read and/or executed by the one or more processors. The memory may include volatile memory, non-volatile memory, or a combination thereof, and store modules that, when executed by the one or more processors, perform certain operations. In some implementations, the modules may be stored in an external storage device and loaded into the memory of server 110.

The modules may include a recommendation engine 130 and content engine 140. The recommendation engine 130 may use code arrays that represent aspects of items to generate set-inclusion criteria and use the criteria to score individual items to determine how similar the individual item is to the set. The items may be stored, for example in an item repository 125. The item repository 125 may represent data stored on a data storage device, such as disk, optical drive, RAM, flash, or some other computer storage device. The items in the item repository 125 may each have an associated code array. The code array is an array of values, where each value represents an aspect of the item. Each aspect may also be referred to as a code with the value of the code representing information about the aspect. Thus, each the value of each code or array position may also be referred to as an aspect value. For example, if the aspect represents a user's interest in cooking, the aspect value may represent the level of interest in cooking. In another example, the aspect may represent the comedic content of a video, the number of faces identified in a picture, etc. In some implementations, the code array may be an array of short hash codes generated by transforming a vector similarity model for the item. For example, the hash codes may be derived from WALS embedding, as described by U.S. Pat. No. 8,165,414, incorporated herein by reference. As another example, the code array may represent any set of well distributed discrete tokens, which taken together indicate item similarity. However, implementations are not limited to embedding vectors or the WALS embedding, but may include any vector similarity model, such as a vector similarity model derived from a stochastic gradient descent or back propagation solution. Typical code arrays include hundreds or even thousands of array positions, representing hundreds or thousands of aspects.

Conventional recommendation systems use embedding vectors to compute the similarity of two items with each other (e.g., via a dot-product of the two embedding vectors). But such conventional recommendation systems typically represent an item set as the sum of the element embedding vectors. This approach does not represent the diversity and structure of the set. However, using the techniques described herein, the code arrays for an item may enable the recommendation system 100 to quickly determine how similar a single item is to a set of items. In some implementations, the item repository 125 may store a code array for each item, as well as other information, such as an identifier, a description, etc. In some implementations, the system 100 may generate the code array for an item as needed. In some implementations, the item repository 125 may represent videos uploaded by clients 170. In some implementations, the item repository 125 may represent images or documents available over the Internet. In some implementations, the item repository 125 may represent items for sale in a catalog or via a particular web site. In some implementations, the data about items in repository 125 may be distributed amongst several computing devices. For example, the server 110 may store the code array and other metadata for each item while another server, such as server 190, may store the description of the item, the content for the item, etc.

In some implementations, the item repository 125 may include set definitions. For example, some items may be classified as "kitchen products," others as "garden products", and still others as "appliances." Put another way, the item repository 125 may define categories or classes for the items in the item repository 125. The recommendation engine 130 may use these definitions to generate set-inclusion criteria for each category/class. Thus, the recommendation engine 130 is understood to operate with user-specific sets and non-user specific sets.

In some implementations, the server 110 may also include user preferences 135. The user preferences 135 may represent data about a particular user's interactions with the items in item repository 125. For example, the user preferences 135 may represent a list of items a particular user has accessed, items that the user has clicked on as a result of a search, items a user has viewed, items a user has purchased, items a user has placed on a wish list, items a user has queried, etc. The user preferences 135 may be stored on a computer storage device, such as disk, RAM, flash, cache, tape, etc. In some implementations, the user preferences 135 may be generated by the content engine 140. The content engine 140 may represent a search engine, such as a search engine for a catalog, a website, an image repository, an intranet, the Internet, etc. The content engine 140 may also represent a social media service, a media search or serving service, or another service that assists a user in accessing the items in the item repository 125. For example, the content engine 140 may represent a video sharing/viewing website that enables a user to search for and watch videos posted by other users. In this example, the content engine 140 may store, with user consent, records of videos watched by the users and may use these records to recommend videos for subsequent viewing to others. For example, conventional recommendation systems may use the records to determine a particular video a first user is watching and recommend other videos to the first user based on what videos other users watched who also watched the particular video. However, such recommendations are not tailored or personalized for the first user.

In contrast, the recommendation engine 130 may be configured to use the first user's history, e.g., stored in user preferences 135, to tailor the recommendations. Recommendation engine 130 may select recommended items that are most similar to the set of videos the user recently watched. Thus, the recommendation engine 130 may use user preferences 135 to define a set of items for the user (e.g., videos the user has recently watched, or items the user has purchased). The recommendation engine 130 may then use the set of items for the user to generate set-inclusion criteria. The set-inclusion criteria may be an array that has a position for each aspect of the code arrays for the items in the set. In some implementations, the set-inclusion criteria may be a list of code-value (e.g., aspect-value) pairs. The value for a code in the set-inclusion criteria may be either an empty (e.g., null) value or a criteria value. The criteria value can represent a highly coherent value or a consensus value that matches a seed value for the code. A highly coherent value is a value for a code that appears in all or nearly all of the items in the set. For example if 90% of the items in the set have the same value for a particular code, the recommendation engine 130 may use that value for the code in the set-inclusion criteria. If the code does not have a highly coherent value, the recommendation engine may mark the code as empty in the set inclusion criteria. In effect, the set inclusion criteria determine which code-value pairs among the hundreds or thousands of codes, are used for determining similarity with the set.

A consensus value is a value a largest plurality of the items in the set have for the code. If there is a tie (e.g., an aspect has two values with an equal number of items from the set), each value in the largest plurality may be considered a consensus value. When the consensus value for a code matches the value for the code in a code array for a seed item, the recommendation engine 130 may use the value as a criteria value for code in the set-inclusion criteria. Otherwise, the recommendation engine 130 may mark the code as null (e.g., an empty value) and the code is not used to compute similarity with the set. The recommendation engine 130 may use set-inclusion criteria based on a consensus value when a user has, for example, recently watched a video or looked at a product and the system provides recommendations that are relevant to this recent item (e.g., the seed item) and consistent with the user preferences (e.g., the set of items). An item is recently accessed if the user is currently accessing the item, just finished accessing the item, or accessed the item in a recent window (e.g., a few seconds to a few minutes). Accessing includes watching, viewing, listening, interacting, etc. The system may use set-inclusion criteria based on coherency when a seed item is not considered in the recommendation problem.

Once the recommendation engine 130 has generated the set-inclusion criteria, individual items may be measured against the criteria. For example, the recommendation engine 130 may compare a video other people watched after watching the current video to the set-inclusion criteria. If the code array for the video demonstrates sufficient similarity (e.g., measured by Hamming distance) to the set-inclusion criteria the recommendation engine 130 may boost the rank of that video because it is similar to things the user has previously accessed. In this manner, two users who are watching a first video may get two different recommendation sets for videos to watch next because the recommended videos are selected based on similarity with the user's own preferences. Similarly, the recommendation engine 130, using coherent set-inclusion criteria, may recommend additional items based on the user's preferences. For example, a news recommendation system may recommend certain current event stories to one user based on the types of articles, documents, blogs, etc., the user has read in the past, while recommending completely different current event stories to another used based on the other user's preferences. Thus, the news service can offer trending news stories that are likely to be of more interest to each particular user.

A user may be using the client 170 in recommendation system 100 to access the server 110. Accordingly, the server 110 may be in communication with one or more client(s) 170 over network 160. Clients 170 may allow users to submit requests to the content engine 140 and receive recommendations from the recommendation engine 130, for example using a web browser. Clients 170 may be an example of computer device 700, as depicted in FIG. 7. Network 160 may be for example, the Internet, or the network 160 can be a wired or wireless local area network (LAN), wide area network (WAN), etc., implemented using, for example, gateway devices, bridges, switches, and/or so forth. Via the network 160, the server 110 may communicate with and transmit data to/from clients 170. In some implementations, server 110 may be in communication with or include other computing devices that provide updates to the item repository 125. For example, the server 110 may include or be in communication with an indexing engine that crawls web server(s) 190 for documents and indexes the contents of the documents. The recommendation system 100 represents one example configuration and implementations may incorporate other configurations. For example, some implementations may combine one or more of the recommendation engine 130 or content engine 140 into a single module or engine. Similarly, one or more components of the user preferences 135 and item repository 125 may be combined or distributed across multiple computing devices.

To the extent that the recommendation system 100 collects and stores user-specific data or may make use of personal information, the users may be provided with an opportunity to control whether programs or features collect the user information (e.g., information about a user's social network, social actions or activities, user input actions, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a recommendation system.

Figure 2:
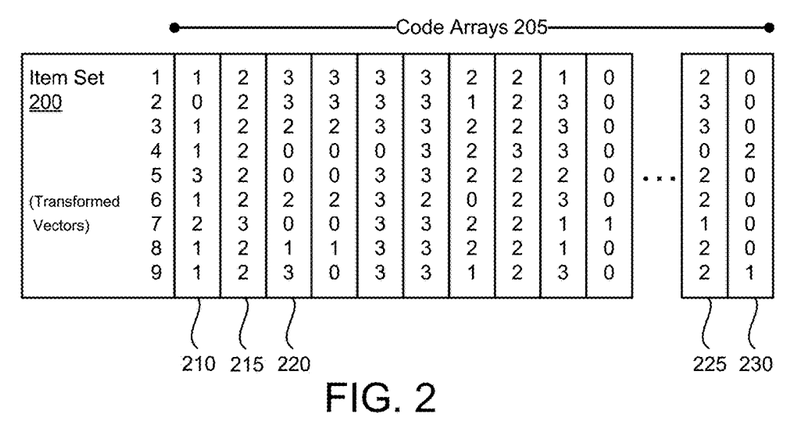
FIG. 2 illustrates an example of code arrays for a set of items, according to an implementation.

FIG. 2 illustrates an example of code arrays 205 for a set of items 200, according to an implementation. In the example of FIG. 2, the set includes nine items (labeled 1-9). In some implementations, the set may represent items that a user has interacted with or previously accessed (e.g., viewed, purchased, etc.). In some implementations the set may represent a category of items. Each column in the code arrays 205 represents an aspect of the item. For example, code arrays 205 include code 210, code 215, code 220, etc. In some implementations, the code array may represent a vector similarity model. In some implementations, the code may be represented by a small hash value, for example a few bytes long. In some implementations, the hash is derived from WALS embeddings. In the example of FIG. 2, the hash code is two bytes so the hash values for the code range from zero to three. A hash code of three bytes may have values that range from zero to seven, etc. In the example of FIG. 2, item 1 has a value of 1 for code 210, a value of 2 for code 215, a value of 3 for code 220, a value of 2 for code 225, and a value of 1 for code 230. Similarly, item 8 has a value of 1 for code 210, a value of 2 for code 215, a value of 1 for code 220, a value of 3 for code 225, and a value of 0 for code 230.

Figure 3:
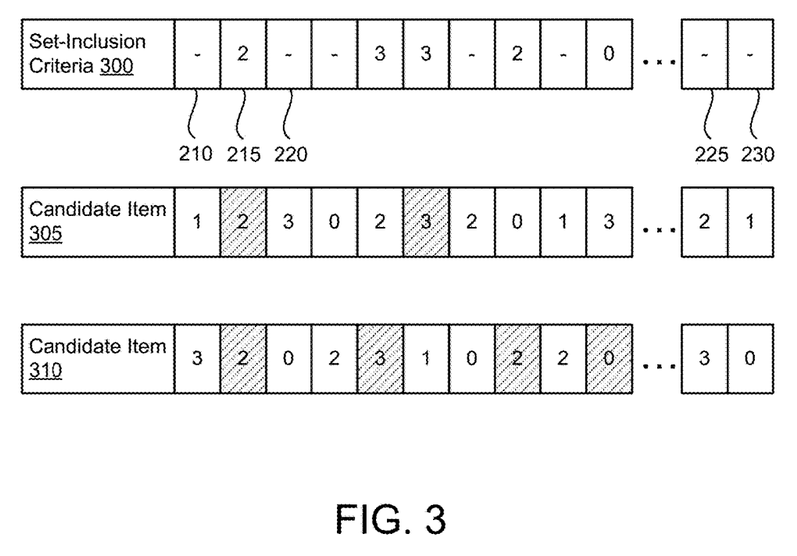
FIG. 3 illustrates an example set-inclusion criteria based on coherence for scoring a candidate item against the set of items illustrated in FIG. 2, according to an implementation.

FIG. 3 illustrates an example set-inclusion criteria 300 based on coherence for scoring a candidate item against the set of items illustrated in FIG. 2, according to an implementation. A recommendation engine may generate the set-inclusion criteria 300 by looking at the code values for each code in the set of items 200, e.g., looking at the values in each column, and determining the value that occurs most often. The value that occurs most often is a consensus value. In the example of FIG. 2, the value 1 occurs most often for code 210, the value 2 occurs most often for code 215, and the values 3 and 0 occur most often for code 220. Similarly, the value 2 occurs most often for code 225, and 0 for code 230. The recommendation engine may determine whether the consensus value for each code is coherent. A value is coherent when it occurs for all or nearly all items in the set. For example, when at least 85% of the items have the same value, the value is coherent. Of course, in some implementations, the coherence percentage may be set higher than 85%. When the consensus value is also a coherent value, the recommendation engine may save the value for the code in the set-inclusion criteria 300. Thus, for example, code 215 has a value of 2 in the set-inclusion criteria 300 because it occurs in 8 of the 9 items in the item set 200. The values for codes 210, 220, 225, and 230 are null or empty in the set-inclusion criteria 300. This occurs because the most common values for those codes are not highly coherent. The recommendation engine may fill the set-inclusion criteria 300 with values for any codes that are coherent in the set of items 200, as illustrated in FIG. 3. Of course, set-inclusion criteria 300 may also be expressed as code-value pairs, where a pair only exists when a code has a corresponding coherent value.

Once the recognition engine has generated the set-inclusion criteria 300, it may use the criteria to evaluate other items. For example, the recommendation system may compare the value of a code for a candidate item with the value of the code in the set-inclusion criteria. The recommendation system may do this for each code in the code array for the candidate item. In some implementations, the recommendation system may determine the percentage of codes in the set-inclusion criteria that match codes in the code array for the candidate item. If the percentage meets a similarity threshold (e.g., is equal to or greater than the threshold), the recommendation system may determine the candidate item is a good candidate for the set and may automatically assign the candidate item to the set, may boost the rank of the candidate item (e.g., so the candidate item is selected as a recommendation), etc.

For example, FIG. 3 illustrates two candidate items, candidate item 305 and candidate item 310. The recommendation system may compare the codes that have values in the set-inclusion criteria 300 to the values in the code array for the candidate item 305. In the example of FIG. 3, candidate item 305 matches two of the five codes in the set-inclusion criteria (illustrated as shaded codes). In some implementations, the similarity between the candidate item 305 and the set of items 200 may be expressed as a ratio or percentage of matching codes, e.g., ⅖ or 40%. Depending on the similarity threshold, this may or may not be considered similar enough for inclusion in the set. Candidate item 310 shares values for four of the five codes in the set-inclusion criteria 300. Thus, the system may conclude candidate item 310 is similar to the items in the set 200 and may recommend candidate item 310 (or boost its rank, etc.).

Figure 4:
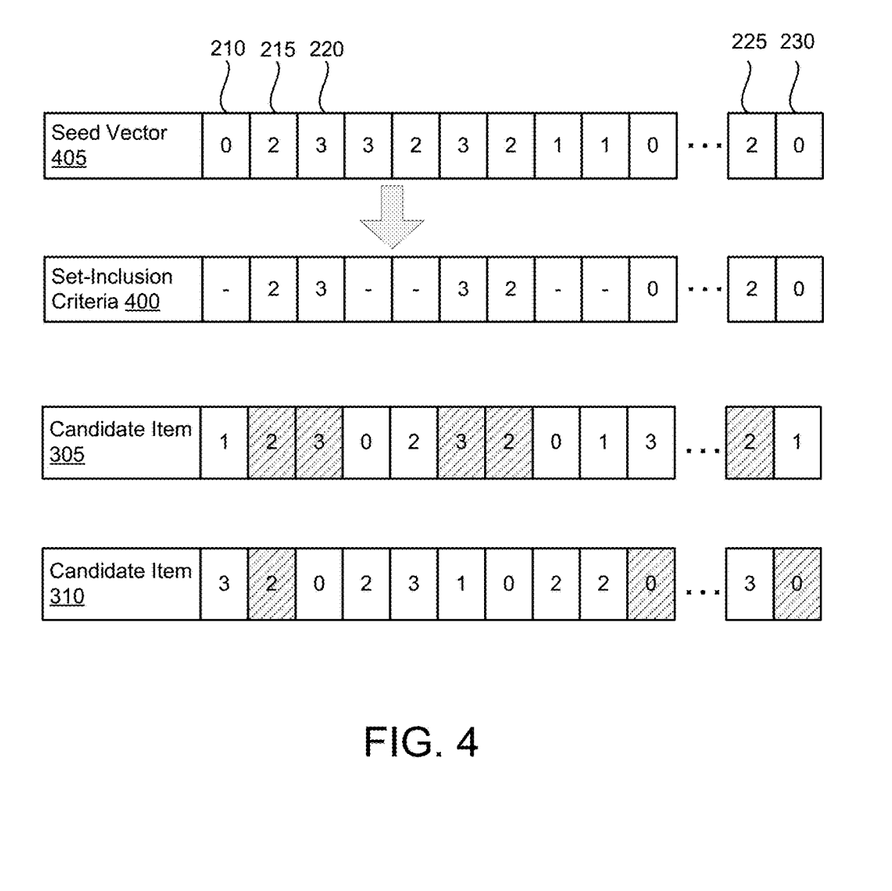
FIG. 4 illustrates an example set-inclusion criteria based on a seed item for scoring a candidate item against the set of items illustrated in FIG. 2, according to an implementation.

FIG. 4 illustrates an example set-inclusion criteria 400 based on a seed item for scoring a candidate item against the set of items illustrated in FIG. 2, according to an implementation. A recommendation engine may generate the set-inclusion criteria 400 by determining the value that occurs most often for each code, as discussed with regard to FIG. 3. The recommendation engine may determine whether the most common value for each code matches the value for the code in a seed item 405. The seed item may be one of the items in an item repository. In some implementations, the seed item may be an item a user recently accessed (e.g., is currently accessing, just finished viewing, interacted with during a recent window, etc.). When the most common value matches the seed value for a code, the recommendation engine may save the value for the code in the set-inclusion criteria 300. Thus, for example, code 215 has a value of 2 in the set-inclusion criteria 400 because it matches the value for code 215 in the code array of the seed item 405. Likewise, code 220 has a value of 3 in the set-inclusion criteria 400 because one of the consensus values for code 220 matches the value for code 220 in the seed item. The values for codes 210 and 230 (and others) are null or empty in the set-inclusion criteria 400. This occurs because the most common values for those codes do not match the values for those codes in the seed item. The recommendation engine may fill the set-inclusion criteria 400 with values for any codes that are the most common value for the code and match a seed item 405, as illustrated in FIG. 4.

Once the recognition engine has generated the set-inclusion criteria 400, it may use the criteria to evaluate candidate items, as described above with regard to FIG. 3. For example, FIG. 4 illustrates the code arrays for the two candidate items, candidate item 305 and candidate item 310. The recommendation system may compare the codes that have values in the set-inclusion criteria 400 to the values in the code array for the candidate item 305. In the example of FIG. 4, candidate item 305 matches five of the seven codes in the set-inclusion criteria 400 (illustrated as shaded codes). In some implementations, the recommendation system may determine the similarity between the candidate item 305 and the set of items 200 is 5/7 or 72%. When this similarity meets a threshold (e.g., is equal to or greater than the threshold) the candidate item 305 may be considered for recommendation. FIGS. 3 and 4 illustrate how the recommendation system may evaluate the same candidate items differently depending on how the set-inclusion criteria are generated. Thus, for example, candidate item 305 does not appear to be very similar to the set 200 when a high-coherence set-inclusion criteria is used, but is similar to the combination of the set and seed item. Similarly, candidate item 310 shares three of seven codes with the set-inclusion criteria 400, and the recommendation system may determine the similarity between the candidate item 310 and the set of items is 3/7 or 43%. Depending on whether this similarity score meets a threshold, the recommendation system may or may not provide candidate item 310 as a recommendation. In some implementations, the recommendation system may boost a rank of a candidate item for recommendation based on the similarity score (e.g., boosting the rank by 42% for candidate item 310).

Figure 5:
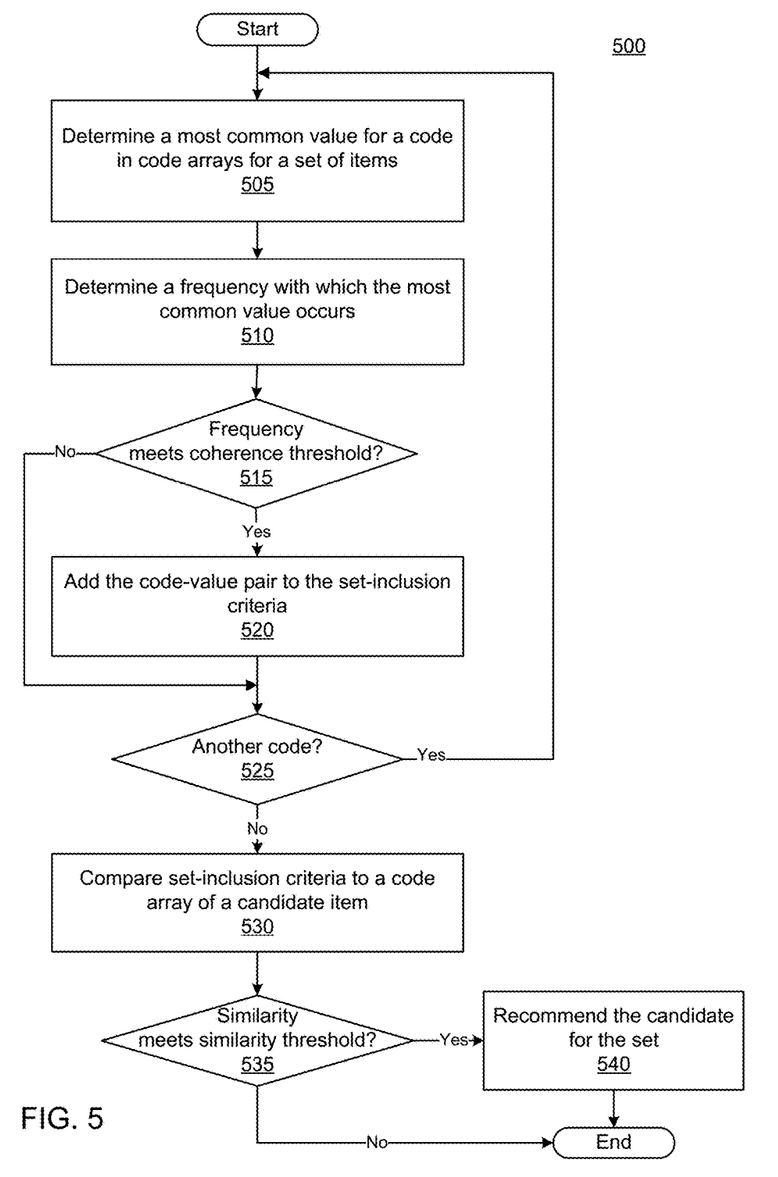
FIG. 5 illustrates a flow diagram of an example process for using coherence to score a candidate item against a set of items, according to an implementation.

FIG. 5 illustrates a flow diagram of an example process 500 for using coherence to score a candidate item against a set of items, according to an implementation. Process 500 may be performed by a recommendation system, such as system 100 of FIG. 1. Process 500 may enable a recognition system to calculate the similarity of a single item to a set of items. In some implementations, the system may use the similarity to automatically categorize the item into the set. In some implementations, the set may be related to a particular user (e.g., represent items the user has accessed), and the system may select the candidate item for recommendation to the user when the item is similar to the set. Process 500 may begin by determining a most common value for a code in code arrays for a set of items (505). In some implementations, the system may store the code arrays for each item. The code arrays may represent a transformed embedding with winner-take-all hash codes as values. The system may determine a frequency with which the most common value occurs (510). The frequency may be represented by a ratio or percentage between the number of times the value appears and the number of items in the set. Thus, for example, a value that occurs nine times in a set with ten items has a frequency of 9/10 or 90%.

The system may determine whether the frequency meets a coherence threshold (515) (e.g., is equal to or greater than the threshold). The coherence threshold may be high, for example at least 85%. A high coherence threshold ensures that only aspects of the items that are shared throughout the set are used to calculate similarity with a candidate item. If the frequency does meet the coherence threshold (515, Yes), the system may add the value and the code to set-inclusion criteria (520). If the frequency does not meet the coherence threshold (515, No) or after adding the code-value pair to the set-inclusion criteria, the system may repeat steps 505-520 for all codes in the code array (525, Yes). When all codes have been evaluated (525, No), the system has generated set-inclusion criteria based on coherence. The system may use the set-inclusion criteria to calculate similarity between the set and candidate items. For example, the system may compare the set-inclusion criteria to the code array of a candidate item (530). For example, the system may determine which of the codes in the set-inclusion criteria have values that match the corresponding values in the code array for the candidate item. The system may determine a similarity from the comparison. For example, the system may use a ratio or percentage that represents the number of matching codes versus the number of codes with non-null values in the set-inclusion criteria.

If the similarity meets (e.g., is equal to or greater than) a similarity threshold (535), the system may recommend the candidate item for the set (540). In some implementations, the system may automatically associate the item with set. Although illustrated as evaluating one candidate item, it is understood that the system may repeat steps 530 to 540 as needed to evaluate a plurality of candidate items. Thus, for example, a news website may evaluate current news stories against a set of news stories a user has read. When a current news story meets the similarity threshold with the set-inclusion criteria generated for the set of news stories the user has read, the system may recommend the news story to the user, for example by pushing the current news story to the user, or displaying the news story on a homepage for the user. Thus, it is understood that in some implementations, steps 505 to 525 may be performed independently of steps 530 to 540.

Figure 6:
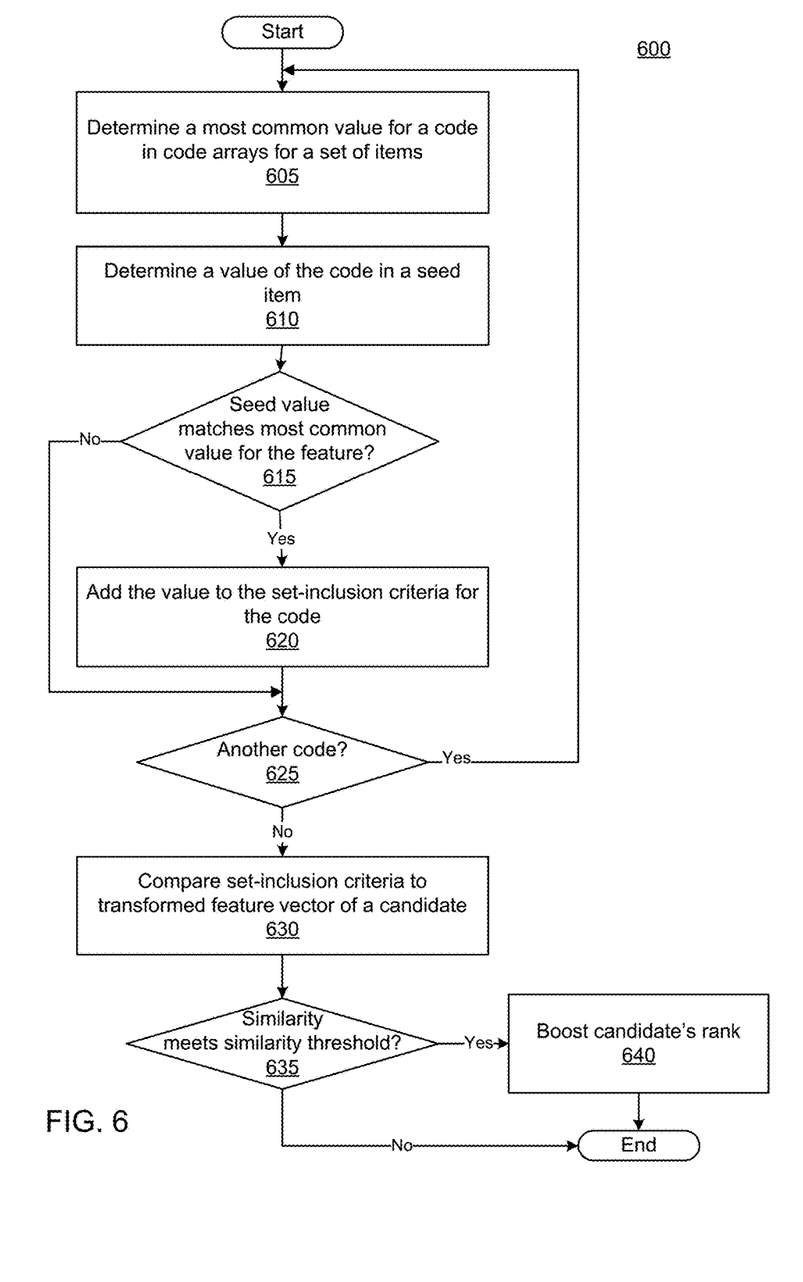
FIG. 6 illustrates a flow diagram of an example process for using a seed to evaluate a candidate item against a set of items, according to an implementation.

FIG. 6 illustrates a flow diagram of an example process 600 for using a seed to evaluate a candidate item against a set of items, according to an implementation. Process 600 may be performed by a recommendation system, such as system 100 of FIG. 1. Process 600 may enable a recognition system to infer user intent in accessing a seed item in order to offer better and more personalized recommendations to the user for "next" items. In some implementations, the system may use the similarity to rank a pool of recommended "next" items so that recommended items more closely align with a user's past history. Of course, process 600 is not limited to such user-specific recommendations, but could be used in any circumstances where a next recommended item benefits from similarity with historical items and a seed item or a next recommended step for a current step is informed by previously performed steps, etc.

Process 600 may begin by determining a most common value for a code in code arrays for a set of items (605). In some implementations, the system may store the code arrays for each item. The code arrays may represent a transformed embedding with winner-take-all hash codes as values. The system may determine a value for the code in the code array of a seed item (610). The seed item may be an item a user recently accessed or interacted with, including currently accessing or interacting with, or may be a preferred item, etc. The system may determine whether the seed value for the code matches the most common value (615). When there is a tie between the most common value (e.g., two values that occur with the same frequency), either of the two most common values can match the seed value. If the seed value matches the most common value (615, Yes), the system may add the value to the set-inclusion criteria for the code (620). In some implementations, this may be a code-value pair. In some implementations, the set-inclusion criteria may be an array with array positions corresponding to codes, as in the code arrays for the items. The system may repeat steps 605 to 620 for each code in the code array (625, Yes). When all codes have been analyzed (625, No), the system has generated the set-inclusion criteria based on a seed item.

The system may use the set-inclusion criteria to calculate similarity with candidate items. For example, the system may compare the set-inclusion criteria to the code array of a candidate item (630). For example, the system may determine which of the codes in the set-inclusion criteria have values that match the corresponding values in the code array for the candidate item. The system may determine a similarity from the comparison. For example, the system may use a ratio or percentage that represents the number of matching codes versus the number of non-null codes in the set-inclusion criteria.

If the similarity meets (e.g., is equal to or greater than) a similarity threshold (635), the system may boost the candidate item's rank (640). For example, in some implementations the candidate item may be part of a group of next items. Next items are items that are related to the seed item. For example, next items may be items that people purchased who also purchased the seed item, may be items that people viewed who also viewed the seed item, may be groups people are in who are also in the seed group, etc. While some of the items may be highly ranked due to popularity (e.g., based on the number of people who watched the item and the seed item), the system may boost the rank of candidate items that meet the similarity threshold for items associated with a particular user. For example, the set of items used to generate the set-inclusion criteria may represent videos watched by a user, and the next items may receive a boost in rank commensurate with the next items' similarity with the set of items. In some implementations, the boost may be proportional to the similarity, so that the more similar the item the higher the boost, while dissimilar items receive little or no boost. Thus, for example, the system may customize the next items to more closely reflect the interests of the user. It is understood that the system may use a user name or user profile, generated with consent of the user, to determine what items are related to the seed item. Thus reference to "person" is understood to also refer to a user name, identifier, or profile associated with the person.

FIG. 7 shows an example of a generic computer device 800, which may be operated as system 100, and/or client 170 of FIG. 1, which may be used with the techniques described here. Computing device 800 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 800 includes a processor 802, memory 804, a storage device 806, and expansion ports 810 connected via an interface 808. In some implementations, computing device 800 may include transceiver 846, communication interface 844, and a GPS (Global Positioning System) receiver module 848, among other components, connected via interface 808. Device 800 may communicate wirelessly through communication interface 844, which may include digital signal processing circuitry where necessary. Each of the components 802, 804, 806, 808, 810, 840, 844, 846, and 848 may be mounted on a common motherboard or in other manners as appropriate.

The processor 802 can process instructions for execution within the computing device 800, including instructions stored in the memory 804 or on the storage device 806 to display graphical information for a GUI on an external input/output device, such as display 816. Display 816 may be a monitor or a flat touchscreen display. In some implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk. In some implementations, the memory 804 may include expansion memory provided through an expansion interface.

The storage device 806 is capable of providing mass storage for the computing device 800. In one implementation, the storage device 806 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 804, the storage device 806, or memory on processor 802.

The interface 808 may be a high speed controller that manages bandwidth-intensive operations for the computing device 800 or a low speed controller that manages lower bandwidth-intensive operations, or a combination of such controllers. An external interface 840 may be provided so as to enable near area communication of device 800 with other devices. In some implementations, controller 808 may be coupled to storage device 806 and expansion port 814. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 830, or multiple times in a group of such servers. It may also be implemented as part of a rack server system. In addition, it may be implemented in a computer, such as a desktop computer 834, a laptop computer 822, a smart phone 836 or tablet, a television with a processor, or a wearable device such as a watch or glasses. An entire system may be made up of multiple computing devices 800 communicating with each other. Other configurations are possible.

FIG. 8 shows an example of a generic computer device 900, which may be system 100 of FIG. 1, which may be used with the techniques described here. Computing device 900 is intended to represent various example forms of large-scale data processing devices, such as servers, blade servers, datacenters, mainframes, and other large-scale computing devices. Computing device 900 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 900 may include any number of computing devices 980. Computing devices 980 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 980a includes multiple racks 958a-958n. Each rack may include one or more processors, such as processors 952a-952n and 962a-962n. The processors may include data processors, network attached storage devices, and other computer controlled devices. In some implementations, one processor may operate as a master processor and control the scheduling and data distribution tasks. Processors may be interconnected through one or more rack switches 958, and one or more racks may be connected through switch 978. Switch 978 may handle communications between multiple connected computing devices 900.

Each rack may include memory, such as memory 954 and memory 964, and storage, such as 956 and 966. Storage 956 and 966 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 956 or 966 may be shared between multiple processors, multiple racks, or multiple computing devices and may include a computer-readable medium storing instructions executable by one or more of the processors. Memory 954 and 964 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 954 may also be shared between processors 952a-952n. Data structures, such as an index, may be stored, for example, across storage 956 and memory 954. Computing device 900 may include other components not shown, such as controllers, buses, input/output devices, communications modules, etc.

An entire system, such as system 100, may be made up of multiple computing devices 900 communicating with each other. For example, device 980a may communicate with devices 980b, 980c, and 980d, and these may collectively be known as system 100. As another example, system 100 of FIG. 1 may include one or more computing devices 900. Some of the computing devices may be located geographically close to each other, and others may be located geographically distant. The layout of system 900 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

According to an aspect, a method of providing recommendations of items includes repeating, for each code in code arrays for items in a set of items, determining a most common value for the code, determining whether the most common value occurs with a frequency that meets an occurrence threshold, and adding the code and the most common value to set-inclusion criteria when the frequency meets the occurrence threshold. The method also includes evaluating a similarity with a candidate item based on the set-inclusion criteria to and making a recommendation regarding the candidate item based on the similarity.

Implementations may also include one or more of the following features. For example, the items in the set may be user profiles associated with an online community and the candidate item is a user profile not associated with the online community. In some implementations, when the similarity meets a similarity threshold the online community is recommended to a user associated with the user profile not associated with the online community. As another example, evaluating the similarity with the candidate item based on the set-inclusion criteria can include determining the similarity by comparing a code array for the candidate item with the set-inclusion criteria and recommending the candidate item for inclusion in the set when the similarity meets a similarity threshold. In some implementations, the similarity represents a ratio of set-inclusion criteria codes that match corresponding codes in the candidate item code array and a total quantity of codes in the set-inclusion criteria.

As another example, the frequency may represent a percentage of items in the set sharing the value and the occurrence threshold is at least eighty-five percent. As another example, the items in the set may represent items a user accessed. As another example, the codes in the code arrays may represent hash codes derived from a vector similarity model. As another example, the items in the set may be user profiles associated with people responding to an advertisement and the candidate item is a user profile.

According to an aspect, a method of providing recommendations of items includes repeating, for each of a plurality of codes in code arrays for items in a set of items, the code representing a hash derived from a vector similarity model, determining a most common value for the code, determining a value for the code from a code array for a seed item, and adding the code and the most common value to set-inclusion criteria when the value for the code from the code array for the seed item matches the most common value. The method also includes using the set-inclusion criteria to evaluate similarity with a candidate item and making a recommendation regarding the candidate item based on the similarity.

Implementations may also include one or more of the following features. For example, the method may also include selecting a set of candidate items, the candidate items being items also accessed by users who accessed the seed item, the candidate item being in the set of candidate items, wherein making the recommendation regarding the candidate item includes boosting a rank of the candidate item when the similarity meets a similarity threshold. As another example, the items in the set of items may have been accessed by a user, the seed item may be an item the user recently accessed, and the candidate item may be an item that is suggested for access. As another example, the items in the set of items may be videos watched by a user, the seed item may be a video the user recently accessed, and the candidate item may be a video suggested for viewing next. As another example, the code array can include hundreds of codes.

According to an aspect, a system includes at least one processor, a data store of items, and a memory storing instructions that, when executed by the at least one processor, cause the system to perform operations. The operations include determining that a first user and a second user each recently accessed a first item from the data store of items and determining a plurality of items from the data store that are related to the first item. The operations also include repeating, for each of a plurality of codes in code arrays for items associated with the first user, determining a consensus value for the code in the plurality of code arrays, determining a value for the code from a code array for the first item, and adding the code and the consensus value to set-inclusion criteria for the first user when the value for the code from the code array for the first item matches the consensus value. The operations further include repeating, for each of a plurality of codes in code arrays for items associated with the second user: determining a most common value for the code in the plurality of code arrays, determining a value for the code from a code array for the first item, and adding the code and the consensus value to set-inclusion criteria for the second user when the value for the code from the code array for the first item matches the consensus value. The operations also include selecting a first subset of the plurality of items related to the first item for recommendation to the first user based on the set-inclusion criteria for the first user and selecting a second subset of the plurality of items related to the first item for recommendation to the second user based on the set-inclusion criteria for the second user, wherein the first subset differs from the second subset.

Implementations may include one or more of the following features. For example, using the set-inclusion criteria for the first user may include, for each of the plurality of items related to the first item, comparing values for codes in the set-inclusion criteria for the first user to values for codes in a code array for the item related to the first item, determining a ratio of a quantity of matching codes to a quantity of total codes in the set-inclusion criteria for the first user, and selecting the item for inclusion in the first subset when the ratio meets a threshold. As another example, using the set-inclusion criteria for the first user includes, for each of the plurality of items related to the first item, computing a similarity between the item and the set-inclusion criteria, determining whether the similarity meets a similarity threshold, and including the item in the subset when the similarity meets the similarity threshold. As another example, a rank of at least one item in the first subset, absent using the set-inclusion criteria, is lower than a rank of an item not included in the first subset.

According to an aspect, a system includes at least one processor, and memory storing instructions that, when executed by the at least one processor, cause the system to perform operations. The operations may include repeating, for each of a plurality of codes in code arrays for items in a set of items, the code representing a hash derived from a vector similarity model, determining a consensus value for the code in the code arrays, determining a value for the code from a code array for a seed item, and adding the code and the consensus value to set-inclusion criteria when the value for the code from the code array for the seed item matches the consensus value. The operations may also include using the set-inclusion criteria to evaluate similarity with a candidate item and making a recommendation regarding the candidate item based on the similarity.

Implementations may include one or more of the following features. For example, the operations may also include selecting a set of candidate items, the candidate items being items also accessed by users who accessed the seed item, the candidate item being in the set of candidate items, wherein making the recommendation regarding the candidate item includes boosting a rank of the candidate item when the similarity meets a similarity threshold. As another example, the items in the set of items may have been accessed by a user, the seed item may be an item the user recently accessed, and the candidate item may be an item that is suggested for access. As another example, the items in the set of items may be videos watched by a user, the seed item may be a video the user is watching, and the candidate item may be a video suggested for viewing next. As another example, the code array may include hundreds of codes.

According to an aspect, a method includes determining aspect values of an item recently viewed by a user that are also consensus aspect values of items previously viewed by the user, determining items viewed by others who also viewed the item recently being viewed by the user, determining at least one of the items viewed by others is similar to the items previously viewed by the user based on the determined aspect values, and suggesting the at least one item to the user for viewing.

Implementations may include one or more of the following features. For example, the aspect values may be code-value pairs with values represented by hash codes. As another example, the consensus aspect values are a subset of hundreds of aspect values. As another example, a rank of the at least one item would, absent being similar to the items previously viewed by the user, fail to qualify the at least one item for recommendation. As another example, the method may also include determining second aspect values of the item recently being viewed by a second user that are also consensus aspect values of items previously viewed by the second user, determining at least a second one of the items viewed by others is similar to the items previously viewed by the second user based on the determined second aspect values, and suggesting the at least second one of the items to the second user for viewing, wherein the at least second one of the items differs from the at least one item.

According to an aspect, a method includes determining that a first user and a second user are viewing an item, determining first user preferences for the first user, and determining second user preferences for the second user. The method may also include suggesting a first recommendation set to the first user based on similarities between the item and the first user preferences, and suggesting a second recommendation set to the second user based on similarities between the item and the second user preferences, wherein the first recommendation set differs from the second recommendation set.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A system comprising:
at least one processor; and
memory storing instructions that, when executed by the at least one processor, cause the system to perform operations comprising:
populating a set-inclusion data structure by repeating, for each code in code arrays for items in a first set of items, the code representing a hash derived from a vector similarity model:
determining a consensus value for the code in the code arrays, a consensus value being a value shared by a largest plurality of items in the first set of items for the code,
determining a value for the code from a code array for a seed item, wherein the seed item is an item currently accessed by a user, and
adding the code and the consensus value to the set-inclusion data structure when the value for the code from the code array for the seed item matches the consensus value,
ranking candidate items in a second set of items based on the set-inclusion data structure, the ranking of each candidate item including:
applying the populated set-inclusion data structure to evaluate similarity with the candidate item by determining a quantity of code-value pairs in the set-inclusion data structure that match code-value pairs in a code array for the candidate item, and
boosting a rank of the candidate item when the quantity meets a similarity threshold, and
providing at least a highest ranked candidate item as a recommended next item for the user while the user is accessing the seed item.

2. The system of claim 1,
wherein the boost in rank of the candidate item is proportional to the quantity of code-value pairs in the set-inclusion data structure that match the code-value pairs in the code array for the candidate item.

3. The system of claim 1, wherein the items in the first set of items were accessed by the user and the second set of items are items also accessed by other users who accessed the seed item.

4. The system of claim 1, wherein the items in the first set of items are videos watched by a user, the seed item is a video the user is watching, and the highest ranked candidate item is a video suggested for viewing next.

5. The system of claim 1, wherein the code array includes at least one thousand codes.

6. The system of claim 1, wherein the quantity represents a percentage of matching code-value pairs out of the number of code-value pairs in the set-inclusion data structure.

7. A method of providing recommendations of items, the method comprising:
populating, by at least one processor, a set-inclusion data structure by repeating, for each code in code arrays for items in a first set of items, the code representing a hash derived from a vector similarity model:
determining, by the at least one processor, a consensus value for the code in the code arrays, a consensus value being a value shared by a largest plurality of items in the first set of items for the code;
determining, by the at least one processor, a value for the code from a code array for a seed item, wherein the seed item is an item currently accessed by a user, and
adding, by the at least one processor, the code and the consensus value to the set-inclusion data structure when the value for the code from the code array for the seed item matches the consensus value;
ranking, by the at least one processor, candidate items in a second set of items based on the set-inclusion data structure, the ranking of each candidate item including:

applying, by the at least one processor, the populated set-inclusion data structure to evaluate a similarity with the candidate item based on the set-inclusions data structure by determining a quantity of code-value pairs in the set-inclusion data structure that match code-value pairs in code array for the candidate item, and boosting, by the at least one processor, a rank of the candidate item when the quantity meets a similarity threshold; and providing, by the at least one processor, at least a highest ranked candidate item as a recommended next item for the user while the user is accessing the seed item.

8. The method of claim 7,
wherein the boost in rank is proportional to the quantity of code-value pairs in the set-inclusion data structure that match the code-value pairs in the code array for the candidate item.

9. The method of claim 7, wherein the items in the first set of items were accessed by a user and the second set of items are items also accessed by other users who accessed the seed item.

10. The method of claim 7, wherein the items in the first set of items are videos watched by a user, the seed item is a video the user recently accessed, and the highest ranked candidate item is a video suggested for viewing next.

11. The method of claim 7, wherein the code array includes at least one thousand codes.

12. The method of claim 7, wherein the user is a first user, the set-inclusions data structure is a first set-inclusion data structure, and the highest ranked candidate item is a first highest-ranked candidate item, and the method further comprises:

populating, by at least one processor, a second set-inclusion data structure for a second user in parallel with the populating the first set-inclusion data structure, the second set-inclusion data structure being populated based on items in a third set of items that are associated with the second user;

ranking, by the at least one processor, the candidate items in the second set of items based on the second set-inclusion data structure to determine a second highest-ranked candidate item; and providing, by the at least one processor, a second-highest ranked candidate item as a recommended next item for the second user while the second user is accessing the seed item, the second highest-ranked candidate item differing from the first highest-ranked candidate item.

13. The method of claim 7, wherein the quantity represents a ratio of set-inclusion criteria codes that match corresponding codes in the candidate item code array and a total quantity of codes in the set-inclusion criteria.

14. The method of claim 7, wherein the items in the second set represent trending news articles.

15. The method of claim 7, wherein
the quantity represents a percentage match between the values of the codes in the set-inclusion data structure and the values of the codes in the code array for the candidate item.

16. A non-transitory machine-readable medium having instructions stored thereon, the instructions, when executed by a processor, cause a computing device to:

populate a set-inclusion data structure by repeating, for each code in code arrays for items in a first set of items, the code representing a hash derived from a vector similarity model:

determine a consensus value for the code in the code arrays, a consensus value being a value shared by a largest plurality of items in the first set of items for the code, determine a value for the code from a code array for a seed item, wherein the seed item is an item currently accessed by a user, and add the code and the consensus value to the set-inclusion data structure when the value for the code from the code array for the seed item matches the consensus value;

rank candidate items in a second set of items based on the set-inclusion data structure, the ranking of each candidate item including:

applying the populated set-inclusion data structure to evaluate similarity with the candidate item by determining a quantity of code-value pairs in the set-inclusion data structure that match code-value pairs in a code array for the candidate item, and boosting a rank of the candidate item when the quantity meets a similarity threshold; and provide at least a highest ranked candidate item as a recommended next item for the user while the user is accessing the seed item.

17. The non-transitory machine-readable medium of claim 16, wherein the boost in rank is proportional to the quantity of code-value pairs in the set-inclusion data structure that match the code-value pairs in the code array for the candidate item.

18. The non-transitory machine-readable medium of claim 16, wherein the items in the first set of items are videos watched by a user, the seed item is a video the user recently accessed, and the highest ranked candidate item is a video suggested for viewing next.

19. The non-transitory machine-readable medium of claim 16, wherein the user is a first user, the set-inclusion data structure is a first set-inclusion data structure, and the highest ranked candidate item is a first highest-ranked candidate item, and the instructions further cause the computing device to:

populate a second set-inclusion data structure for a second user in parallel with populating the first set-inclusion data structure, the second set-inclusion data structure being populated based on items in a third set of items that are associated with the second user;

rank the candidate items in the second set of items based on the second set-inclusion data structure to determine a second highest-ranked candidate item; and provide a second highest-ranked candidate item as a recommended next item for the second user while the second user is accessing the seed item, the second highest-ranked candidate item differing from the first highest-ranked candidate item.

20. The non-transitory machine-readable medium of claim 16, wherein the quantity represents a ratio of set-inclusion criteria codes that match corresponding codes in the candidate item code array and a total quantity of codes in the set-inclusion criteria.

* * * * *